United States Patent [19]

Jin

[11] Patent Number: 5,065,239
[45] Date of Patent: Nov. 12, 1991

[54] AUTOMATIC CONTROL CIRCUIT FOR VERTICAL SYNCHRONIZING SIGNAL

[75] Inventor: Tae J. Park, Suweon, Rep. of Korea

[73] Assignee: Samsung Electronics Co., Ltd., Suweon, Rep. of Korea

[21] Appl. No.: 552,790

[22] Filed: Jul. 11, 1990

[30] Foreign Application Priority Data

Dec. 19, 1989 [KR] Rep. of Korea ............ 89-18895

[51] Int. Cl.$^5$ ............................................. H04N 5/04
[52] U.S. Cl. ............................................ 358/148; 315/370
[58] Field of Search ............. 358/150, 148, 158, 152, 358/153, 154; 315/370, 364

[56] References Cited

U.S. PATENT DOCUMENTS

| | | | |
|---|---|---|---|
| 4,621,240 | 11/1986 | Alvord et al. | 358/148 X |
| 4,709,267 | 11/1987 | Sendelweck | 358/148 |
| 4,803,552 | 2/1989 | Marin | 358/148 |

Primary Examiner—Victor R. Kostak
Attorney, Agent, or Firm—Ladas & Parry

[57] ABSTRACT

An automatic control circuit for a vertical synchronizing signal comprising an input stage for converting a vertical synchronizing signal applied from the external to a low level signal, a proportion-oscillator for providing a triggered signal, a discriminator for discriminating the input of the vertical synchronizing signal, an oscillation-stop controller for driving in relation to the input discriminator, a vertical synchronizing signal oscillator for oscillating in relation to the oscillation-stop controller and a ramp generator for normalizing an output waveform of the vertical synchronizing signal controller, wherein the vertical synchronizing signal of which frequency is the same with that of the external vertical synchronizing signal can be generated by using the pulse of the external vertical synchronizing signal as a trigger and be independent of a frequency range and a surrounding temperature.

5 Claims, 3 Drawing Sheets

AUTOMATIC CONTROL CIRCUIT FOR VERTICAL SYNCHRONIZING SIGNAL

BACKGROUND OF THE INVENTION

The present invention relates to televisions or monitors, more particularly to an automatic control circuit for a vertical synchronizing signal which can automatically control the synchronizing signal with different frequencies of vertical signals applied from the external.

The synchronizing signal is transmitted along with an image signal for synchronizing the speed and the time of a scanning line between transmitting and receiving sides. Also, the synchronizing signal is used to control the frequency of a vertical and a horizontal deflecting oscillator circuit in the receiver.

In the televisions or monitors, when a vertical synchronizing signal of different frequency is applied, as shown in FIG. 1, a vertical synchronizing signal adjusting part 2 is manually controlled for synchronizing the frequency of the vertical synchronizing signal VS applied from the external with that of a vertical synchronizing signal oscillator 1, or a frequency discriminator 3 discriminates the frequency of the vertical synchronizing signal VS applied from the external and provides a discriminated output to an oscillation-controller 4. Next, the oscillation controller 4 applies a control signal to the vertical synchronizing signal oscillator 1 so that the oscillator 1 generates a vertical synchronizing signal of which frequency is the same with that of the external vertical synchronizing signal.

The vertical synchronizing signal generated from the oscillator 1 is normalized at a ramp generator 5 to be applied to an output stage 6. The ramp generator 5 can provide a stable vertical synchronizing signal only when the frequency of the vertical synchronizing signal oscillator 1 is less than or equal to that of the external vertical synchronizing signal.

In this conventional vertical synchronizing signal generator circuit, however, the frequency discriminator 3 and the oscillation controller 4 become very complicated in case of wide frequency bandwidth of the external vertical synchronization signal, and the vertical synchronizing signal adjusting part 2 can't control all the wide frequency bandwidth. Particularly, the vertical synchronizing signal oscillator 1 has a problem that it cannot provide any stable vertical synchronizing signal since the oscillating frequency of the vertical synchronizing signal oscillator 1 changes as the surrounding temperature changes.

SUMMARY OF THE INVENTION

It is an object of the present invention to provide an automatic control circuit for a vertical synchronizing signal which can generate the same frequency with that of an external vertical synchronizing signal by driving the frequency oscillator circuit according to the frequency of the external vertical synchronizing signal, and which is independent of the change of the frequency range and the surrounding temperature.

According to the present invention, there is provided an automatic control circuit for a vertical synchronizing signal comprising an input stage for converting a vertical synchronizing signal applied from the external into a low level signal; a proportion-oscillator connected to said input stage for providing a triggered signal according to the vertical synchronizing signal of said input stage; a discriminator connected to said proportion-oscillator for discriminating the input of the vertical synchronizing signal according to an output signal of said proportion oscillator; an oscillation-stop controller connected to said discriminator for driving according to an output signal of said input discriminator; a vertical synchronizing signal oscillator, connected to said oscillation-stop controller for oscillating according to the control of said oscillation-stop controller; and a ramp generator for normalizing an output waveform of said vertical synchronizing signal oscillator.

BRIEF DESCRIPTION OF THE DRAWINGS

These and other objects, features, and advantages of the present invention will become more apparent from the following description for the preferred embodiments taken in conjunction with the accompanying drawings, in which.

DETAILED DESCRIPTION OF THE PREFERRED EMBODIMENTS

The present invention will be now described in more detail with reference to the accompanying drawings.

Figure 1:
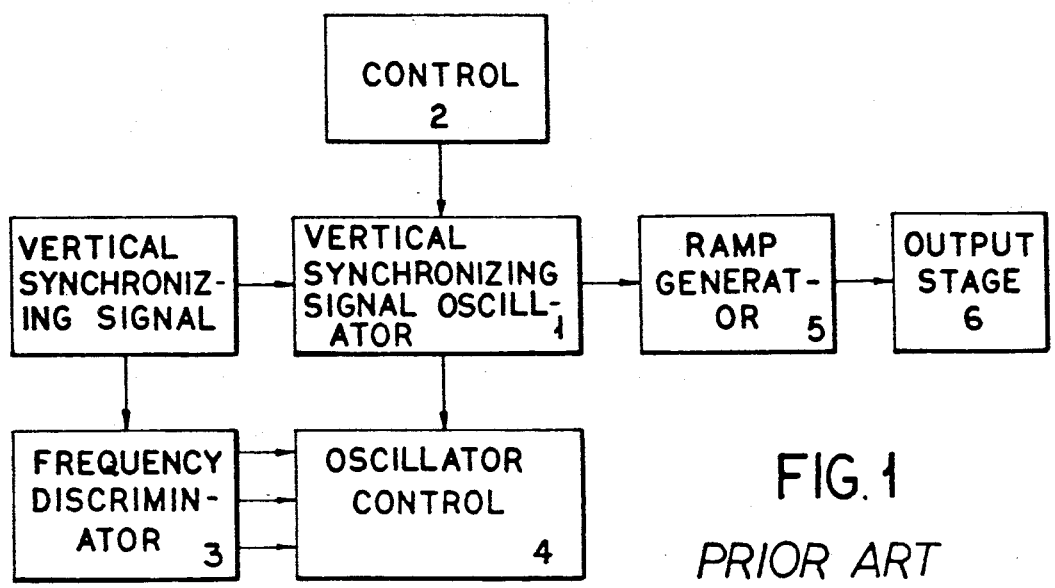
FIG. 1 is a block diagram of a conventional vertical synchronizing signal generator circuit.
Figure 2:
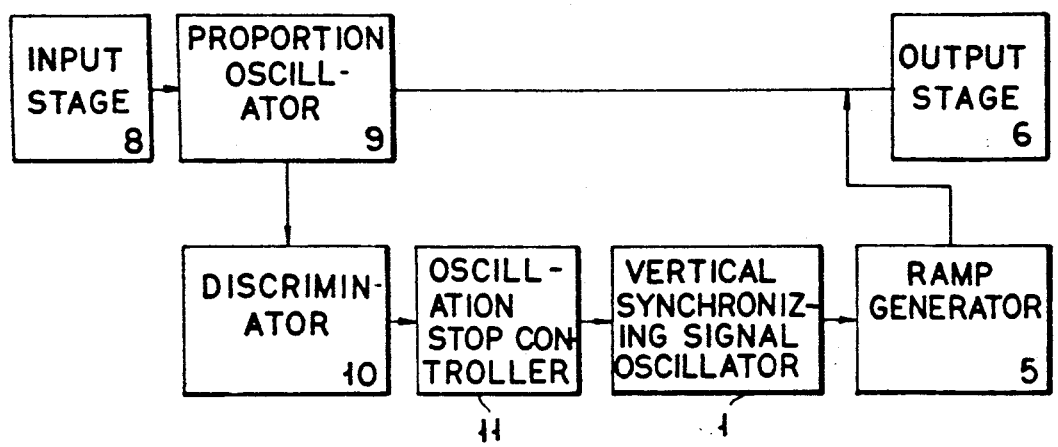
FIG. 2 is a block diagram of an automatic control circuit of a vertical synchronizing signal according to the present invention.
Figure 3:
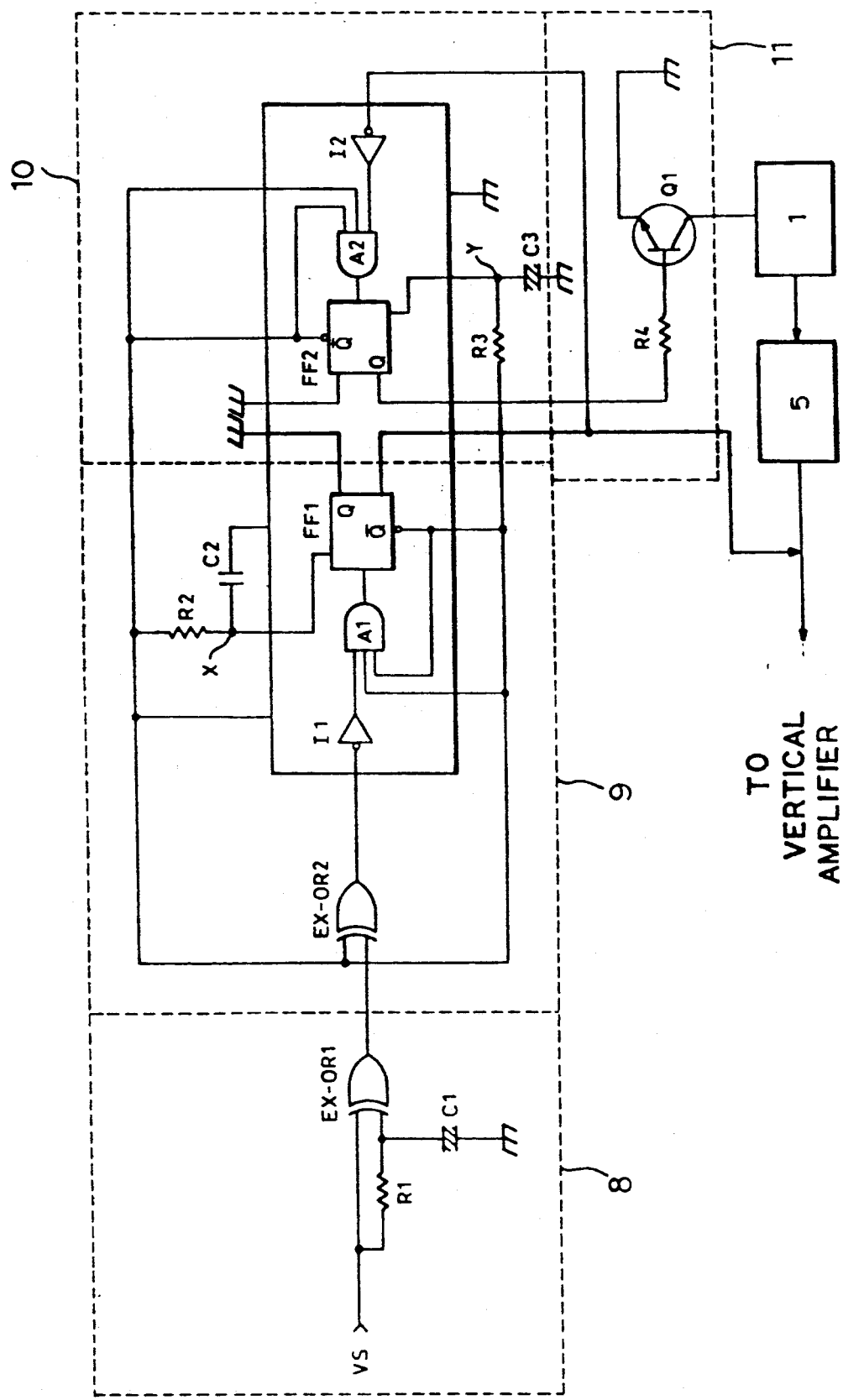
FIG. 3 is an automatic control circuit for a vertical synchronizing signal according to the present invention.
Figure 4:
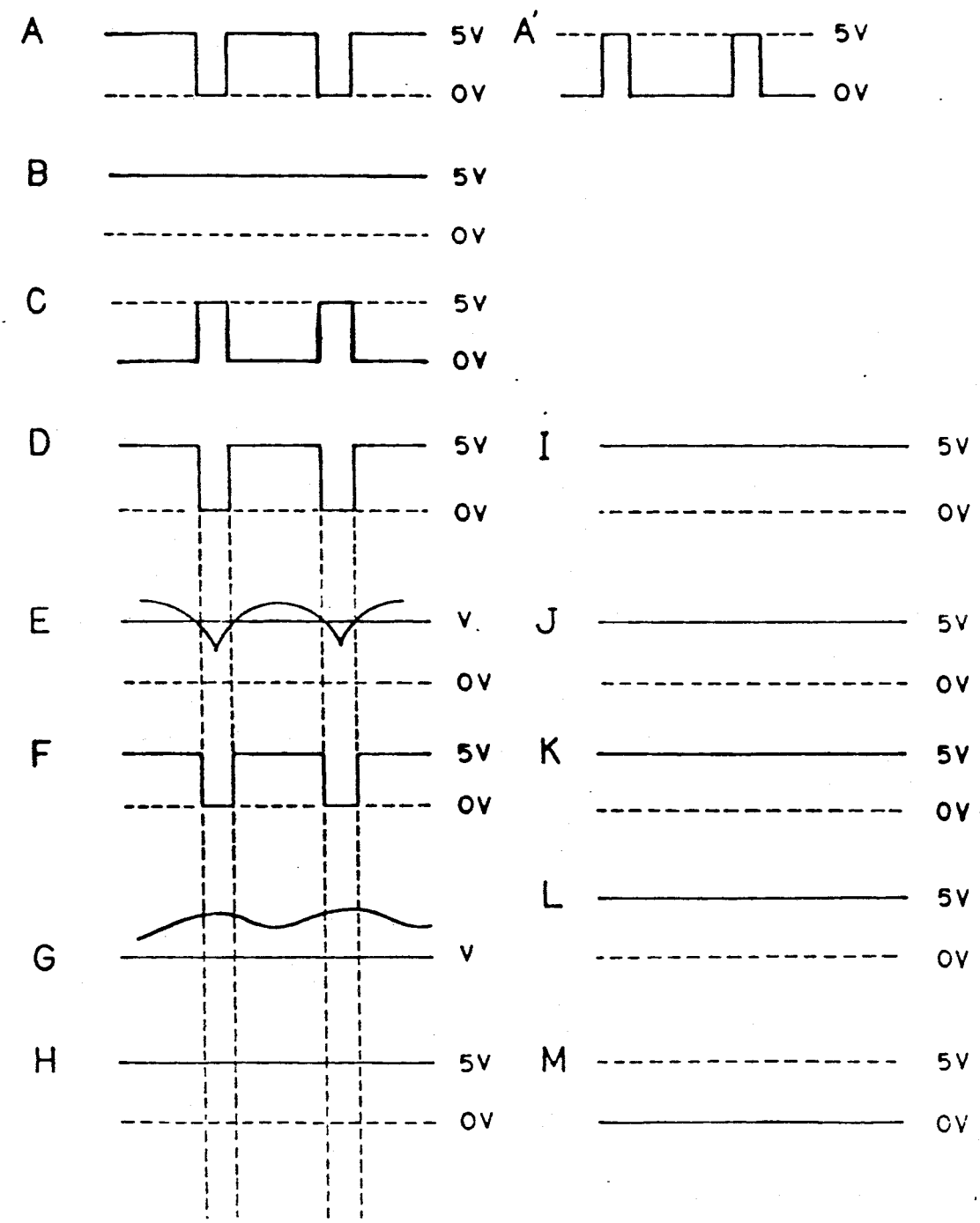
FIG. 4 is a waveform diagram of each part in automatic control circuit for a vertical synchronizing signal according to the present invention.

FIG. 2 is a block diagram of an automatic control circuit for a vertical synchronizing signal and FIG. 3 is an automatic control circuit for a vertical synchronizing signal according to the present invention.

In an input stage 8 for converting a vertical synchronizing signal VS applied from the external into a high level, the external vertical synchronizing signal VS is applied to a resistor R1 and a capacitor C1 for charging and discharging with the RC time constant. A discharged output of the resistor R1 and the capacitor C1 and the external vertical synchronizing signal VS are applied to an EXCLUSIVE-OR gate EX-OR1 so that the vertical synchronizing signal VS is converted a high level.

A proportion-oscillator 9 for generating the same frequency signal with an output frequency of the input stage 8 according to the frequency signal of the input stage 8 and a discriminator 10 are formed of one integrated circuit IC1 and connected with resistors R1 and R2, and capacitors C2 and C3 from the external for controlling an output waveform of the proportion-oscillator 9 and the discriminator 10.

Said proportion-oscillator 9 comprises an EXCLUSIVE-OR gate EX-OR2 for converting an output of the EXCLUSIVE-OR gate EX-OR1 into a synchronizing signal of high level by combining the output of the EXCLUSIVE-OR gate EX-OR1 with an external supply voltage VDD. The propotion-oscillator 9 also includes an inverter I1 for inverting an output of the EXCLUSIVE-OR gate EX-OR2 and an AND gate A1 for combining an output of the inverter I1 with the external supply voltage VDD. In addition, the proportion-oscillator 9 includes a Flip-Flop FF1 being triggered by an output of the AND gate A1. Such an oscillated pulse width from the Flip-Flop FF1 is controlled by the resistor R2 and the capacitor C2 connected to the integral circuit IC1 and the supply voltage VDD is applied to a clear terminal of the Flip-Flop FF1 so that the Flip-Flop FF1 is always turned on.

A discriminator 10 for discriminating the existence or nonexistence of the external vertical synchronizing signal VS according to the output of the proportion-oscillator 9 comprises an inverter I2 for inverting an output of the Flip-Flop FF1 in the proportion-oscillator 9 and an AND gate A2 for combining an output of the inverter I2 with the supply voltage VDD. The discriminator 10 also includes a Flip-Flop FF2 being triggered by an output of the AND gate A2. Such an oscillated pulse width is controlled by the resistor R3 and the capacitor C3 connected to the integrated circuit IC1 with the large RC time constant.

An oscillation-stop controller 11 switching according to an output of the discriminator 10 comprises a transistor Q1 to be driven by an output of the Flip-Flop FF2 in the discriminator 10. The vertical synchronizing signal oscillator 1, which oscillates according to the control of the oscillation-stop controller 11, stops the oscillation when the transistor Q1 of the oscillation-stop controller 11 is turned on. Next, the output of the vertical synchronizing signal oscillator 1 is provided to the ramp generator 5 to be normalized and to be provided.

In this automatic control circuit for the vertical synchronizing signal as described above, as shown in FIG. (4), the resistor R1 and the capacitor C1 provide a low or high level signal A or A' to the EXCLUSIVE-OR gate EX-OR1 by charging or discharging in relation to the level of the external vertical synchronizing signal VS. For example, the resistor R1 and the capacitor C1 provides a low level signal to the EXCLUSIVE-OR gate EX-OR1 when the vertical synchronizing signal is a high level, while provides a high level signal C to the EXCLUSIVE-OR gate EX-OR1 when the vertical synchronizing signal is a low level. Next, the EXCLUSIVE-OR gate EX-OR2 receives the high level pulse C and a supply voltage B and provides a low level signal D so that the input synchronizing signal is leveled down.

The pulse D is inverted by the inverter I1 and such an inverted output is applied to the AND gate A1. Next, the output of the AND gate A1 is applied to the Flip-Flop FF1. The RC time constant of the resistor R2 and the capacitor C2 connected to the Flip-Flop FF1 is small so a pulse E oscillating up and down the threshold voltage V of the Flip-Flop FF1 is output to a node X. Thus, an output terminal $\overline{Q}$ of the Flip-Flop FF1 provides a pulse F leveled down at a falling edge of the pulse E. Accordingly, the proportion-oscillator 9 generates the corresponding frequency pulse F to that of the vertical synchronizing signal by being triggered with the pulse of the input vertical synchronizing signal VS without the oscillation by means of any separate oscillator circuit.

The pulse F is inverted by the inverter I2 and is next applied to the AND gate A2. The output of the AND gate A2 is applied to the Flip-Flop FF2 so that the Flip-Flop FF2 oscillates the triggered signal, but the pulse G formed by the resistor R3 and the capacitor C3 with the large RC time constant does not exceed the threshold voltage V required for the Flip-Flop FF2, hence the Flip-Flop FF2 provides a high level signal H. Thus, the oscillation-stop controller 11 whereto the pulse H is applied as an input, stops the driving of the vertical synchronizing signal oscillator 1 connected to the next of the oscillation-stop controller 11 by turning on the transistor Q1 thereof. Furthermore the voltage B of the power supply voltage VDD is applied to reset terminals of the Flip-Flops FF1 and FF2 so that the Flip-Flops FF1 and FF2 are alway operating.

When the vertical synchronizing signal is not applied from the external, the output of the EXCLUSIVE-OR gate EX-OR1 becomes a low level and the EXCLUSIVE-OR gate EX-OR2, which receives the low level output of the EXCLUSIVE-OR gate EX-OR1 and the high level supply voltage VDD, provides a high level output I. The high level signal I is inverted into a low level signal by the inverter I1 so as to be applied to the Flip-Flop FF1 and the voltage of the node X between the resistor R2 and the capacitor C2 becomes the high level I since the Flip-Flop FF1 is not triggered and the output terminal $\overline{Q}$ of the Flip-Flop FF1 becomes a high level signal K.

The high level signal K provided from the output terminal $\overline{Q}$ of the Flip-Flop FF1 is inverted into a low level by the inverter I2 so as to be applied to the AND gate A2 so that a low level signal is always applied to the Flip-Flop FF2. Thus, a node Y is raised up to a high level L through the resistor R3 and the Flip-Flop FF2 provides a low level signal M since the Flip-Flop FF2 is not triggered. The transistor Q1 in the oscillation-stop controller 11 is turned off by the low level output of the Flip-Flop FF2 so that the vertical synchronizing signal oscillator 1 begins to operate. Such an oscillated frequency signal is provided after the waveform normalization by the ramp generator 5 so that one cross line does not appear on the screen when the vertical synchronizing signal is not applied from the external.

As apparent from the abovementioned description, the present invention can generate the vertical synchronizing signal which has the same frequency with that of the external vertical synchronizing signal by using the pulse of the external vertical synchronizing signal as the trigger and which is independent of the frequency range and the surrounding temperature.

The invention is in no way limited to the embodiment, described hereinabove. Various modifications of the disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. An automatic control circuit for a vertical synchronizing signal, comprising:
   an input stage for converting a vertical synchronizing signal applied from the external to a low level signal;
   a proportion-oscillator connected to said input stage for providing a triggered signal according to the vertical synchronizing signal of said input stage;
   a discriminator connected to said proportion-oscillator for discriminating the input of the vertical synchronizing signal according to an output signal of said proportion-oscillator;
   an oscillation-stop controller connected to said discriminator for being driven by an output signal of said input discriminator;
   a vertical synchronizing signal oscillator connected to said oscillation-stop controller for oscillating according to the control of said oscillation-stop controller; and a ramp generator for normalizing an output waveform of said vertical synchronizing signal oscillator.

2. An automatic control circuit for a vertical synchronizing signal according to claim 1, wherein said input stage comprises:

a resistor (R1) and a capacitor (C1) for charging and discharging from the vertical synchronizing signal applied from the external and;

an EXCLUSIVE-OR gate (EX-OR1) connected to said resistor and capacitor for combining an output of said resistor and capacitor with the vertical synchronizing signal.

3. An automatic control circuit for a vertical synchronizing signal according to claim 1, wherein said proportion-oscillator connected to said input stage comprises:

an inverter (I1) connected to said EXCLUSIVE-OR gate combining an output of said input stage with supply voltage and to an EXCLUSIVE-OR gate (EX-OR2), so as to invert an output of the EXCLUSIVE-OR gate(EX-OR2);

an AND gate (A1) for combining an output of said inverter with the external supply voltage;

a Flip-Flop(FF1) connected to said AND gate for oscillating by being triggered according to an output of said AND gate;

and a resistor(R2) and a capacitor(C2) for controlling an output pulse width of said Flip-Flop.

4. An automatic control circuit for a vertical synchronizing signal according to claim 1, wherein said discriminator comprises:

an inverter (I2) connected to said proportion-oscillator for inverting an output of said proportion-oscillator;

an AND gate (A2) for combining an output of said inverter with the external supply voltage;

a Flip-Flop(FF2) connected to said AND gate for oscillating according to an output of said AND gate; and a resistor (R3) and a capacitor (C3) for controlling an output pulse width of said Flip-Flop.

5. An automatic control circuit for a vertical synchronizing signal according to the claim 1, wherein said oscillation-stop controller comprises a transistor connected to said discriminator for driving by the output signal of said discriminator.

* * * * *